(12) United States Patent
Baby et al.

(10) Patent No.: US 8,126,932 B2
(45) Date of Patent: *Feb. 28, 2012

(54) INDEXING STRATEGY WITH IMPROVED DML PERFORMANCE AND SPACE USAGE FOR NODE-AWARE FULL-TEXT SEARCH OVER XML

(75) Inventors: Thomas Baby, Maple Valley, WA (US); Zhen Hua Liu, San Mateo, CA (US); Wesley Lin, West Covina, CA (US)

(73) Assignee: Oracle International Corporation, Redwood Shores, CA (US)

( * ) Notice: Subject to any disclaimer, the term of this patent is extended or adjusted under 35 U.S.C. 154(b) by 565 days.

This patent is subject to a terminal disclaimer.

(21) Appl. No.: 12/346,393

(22) Filed: Dec. 30, 2008

(65) Prior Publication Data

US 2010/0185683 A1 Jul. 22, 2010

(51) Int. Cl.
*G06F 7/00* (2006.01)

(52) U.S. Cl. ...................................................... 707/803

(58) Field of Classification Search .................. 707/803, 707/802, 809, 999.103, 102, 4, 999.1, 706, 707/705, 736, 758; 715/513

See application file for complete search history.

(56) References Cited

U.S. PATENT DOCUMENTS

| | | | |
|---|---|---|---|
| 5,210,686 A | 5/1993 | Jernigan | |
| 5,369,763 A | 11/1994 | Biles | |
| 5,404,513 A | 4/1995 | Powers et al. | |
| 5,410,691 A | 4/1995 | Taylor | |
| 5,454,101 A | 9/1995 | Mackay et al. | |
| 5,467,471 A | 11/1995 | Bader | |
| 5,524,240 A | 6/1996 | Barbara et al. | |
| 5,530,849 A | 6/1996 | Hanushevsky et al. | |
| 5,544,360 A | 8/1996 | Lewak et al. | |
| 5,546,571 A | 8/1996 | Shan et al. | |
| 5,568,640 A | 10/1996 | Nishiyama et al. | |
| 5,680,614 A | 10/1997 | Bakuya et al. | |

(Continued)

FOREIGN PATENT DOCUMENTS

| | | |
|---|---|---|
| WO | WO 01/42881 | 6/2001 |
| WO | WO 03/027908 | 4/2003 |

OTHER PUBLICATIONS

U.S. Appl. No. 11/827,801, filed Jul. 13, 2007, Notice of Allowance, Mailing Date Jul. 9, 2010.

(Continued)

*Primary Examiner* — Hung T Vy
(74) *Attorney, Agent, or Firm* — Hickman Palermo Truong & Becker LLP; Eric L. Sutton (57) ABSTRACT

Techniques are provided for searching within a collection of XML documents. A relational table stores an entry for each node of a set of nodes in a collection of XML documents. Each entry of the relational table stores an order key and a path identifier along with the atomized value of the node. Instead of storing the atomized value in a full-text index, a virtual column can be created to represent, for each node, the atomized value of the node. Alternately, each entry of the relational table stores an order key and a path identifier along with, for simple nodes, the atomized value, and for complex nodes, a null value. For a complex node with a descendant text node, a separate entry is stored for the descendant text node in the relational table.

20 Claims, 3 Drawing Sheets

U.S. PATENT DOCUMENTS

| | | | |
|---|---|---|---|
| 5,701,467 A | 12/1997 | Freeston | |
| 5,838,965 A | 11/1998 | Kavanagh et al. | |
| 5,842,212 A | 11/1998 | Ballurio et al. | |
| 5,917,492 A | 6/1999 | Bereiter et al. | |
| 5,921,582 A | 7/1999 | Gusack | |
| 5,964,407 A | 10/1999 | Sandkleiva | |
| 5,974,407 A | 10/1999 | Sacks | |
| 6,055,544 A | 4/2000 | DeRose et al. | |
| 6,101,500 A | 8/2000 | Lau | |
| 6,111,578 A | 8/2000 | Tesler | |
| 6,112,209 A | 8/2000 | Gusack | |
| 6,128,610 A | 10/2000 | Srinivasan et al. | |
| 6,141,655 A | 10/2000 | Johnson et al. | |
| 6,182,121 B1 | 1/2001 | Wlaschin | |
| 6,192,273 B1 | 2/2001 | Igel et al. | |
| 6,192,373 B1 | 2/2001 | Haegele | |
| 6,208,993 B1 | 3/2001 | Shadmon | |
| 6,236,988 B1 | 5/2001 | Aldred | |
| 6,279,007 B1 | 8/2001 | Uppala | |
| 6,330,573 B1 | 12/2001 | Salisbury et al. | |
| 6,370,537 B1 | 4/2002 | Gilbert et al. | |
| 6,427,123 B1 | 7/2002 | Sedlar | |
| 6,470,344 B1 | 10/2002 | Kothuri et al. | |
| 6,487,546 B1 | 11/2002 | Witkowski | |
| 6,496,842 B1 | 12/2002 | Lyness | |
| 6,539,398 B1 | 3/2003 | Hannan et al. | |
| 6,604,100 B1 | 8/2003 | Fernandez et al. | |
| 6,609,121 B1 | 8/2003 | Ambrosini et al. | |
| 6,636,845 B2 | 10/2003 | Chau et al. | |
| 6,643,633 B2 | 11/2003 | Chau et al. | |
| 6,684,227 B2 | 1/2004 | Duxbury | |
| 6,725,212 B2 | 4/2004 | Couch et al. | |
| 6,772,350 B1 | 8/2004 | Belani et al. | |
| 6,826,727 B1 | 11/2004 | Mohr et al. | |
| 6,836,857 B2 | 12/2004 | Ten-Hove et al. | |
| 6,920,457 B2 | 7/2005 | Pressmar | |
| 7,043,488 B1 | 5/2006 | Baer et al. | |
| 7,047,253 B1 | 5/2006 | Murthy et al. | |
| 7,051,033 B2 | 5/2006 | Agarwal et al. | |
| 7,089,239 B1 | 8/2006 | Baer et al. | |
| 7,139,746 B2 | 11/2006 | Shin et al. | |
| 7,162,485 B2 | 1/2007 | Gottlob et al. | |
| 7,171,404 B2 | 1/2007 | Lindblad et al. | |
| 7,366,735 B2 | 4/2008 | Chandrasekar et al. | |
| 7,398,265 B2 | 7/2008 | Thusoo et al. | |
| 7,493,305 B2 | 2/2009 | Thusoo et al. | |
| 7,499,915 B2 | 3/2009 | Chandrasekar et al. | |
| 2002/0078068 A1 | 6/2002 | Krishnaprasad et al. | |
| 2002/0103829 A1 | 8/2002 | Manning et al. | |
| 2002/0116371 A1 | 8/2002 | Doods et al. | |
| 2002/0143512 A1 | 10/2002 | Shamoto et al. | |
| 2002/0152267 A1 | 10/2002 | Lennon | |
| 2002/0156811 A1 | 10/2002 | Krupa | |
| 2002/0184188 A1 | 12/2002 | Mandyam et al. | |
| 2002/0184401 A1 | 12/2002 | Kadel, Jr. et al. | |
| 2002/0188613 A1 | 12/2002 | Chakraborty et al. | |
| 2003/0009361 A1 | 1/2003 | Hancock et al. | |
| 2003/0065659 A1 | 4/2003 | Agarwal et al. | |
| 2003/0078906 A1 | 4/2003 | Ten-Hove et al. | |
| 2003/0101194 A1 | 5/2003 | Rys et al. | |
| 2003/0131051 A1 | 7/2003 | Lection et al. | |
| 2003/0182268 A1 | 9/2003 | Lal | |
| 2003/0212662 A1 | 11/2003 | Shin et al. | |
| 2003/0212664 A1 | 11/2003 | Breining et al. | |
| 2004/0010752 A1 | 1/2004 | Chan et al. | |
| 2004/0060006 A1 | 3/2004 | Lindbald et al. | |
| 2004/0060007 A1* | 3/2004 | Gottlob et al. | 715/513 |
| 2004/0064466 A1 | 4/2004 | Manikutty et al. | |
| 2004/0068494 A1 | 4/2004 | Tozawa et al. | |
| 2004/0088320 A1 | 5/2004 | Perry | |
| 2004/0167904 A1 | 8/2004 | Wen et al. | |
| 2004/0205551 A1 | 10/2004 | Santos | |
| 2004/0225865 A1 | 11/2004 | Cox et al. | |
| 2005/0050016 A1 | 3/2005 | Stanoi et al. | |
| 2005/0091188 A1* | 4/2005 | Pal et al. | 707/1 |
| 2005/0228792 A1 | 10/2005 | Chandrasekaran et al. | |
| 2005/0228818 A1* | 10/2005 | Murthy et al. | 707/102 |
| 2005/0229158 A1 | 10/2005 | Thusoo et al. | |
| 2005/0289175 A1 | 12/2005 | Krishnaprasad et al. | |
| 2006/0004858 A1 | 1/2006 | Tran et al. | |
| 2006/0047646 A1* | 3/2006 | Maluf et al. | 707/4 |
| 2006/0053122 A1 | 3/2006 | Korn et al. | |
| 2006/0100989 A1 | 5/2006 | Chinchwadkar et al. | |
| 2006/0112090 A1 | 5/2006 | Amer-Yahia et al. | |
| 2006/0129584 A1 | 6/2006 | Hoang et al. | |
| 2006/0161575 A1 | 7/2006 | Fan et al. | |
| 2006/0212420 A1 | 9/2006 | Murthy et al. | |
| 2007/0016605 A1* | 1/2007 | Murthy et al. | 707/102 |
| 2007/0255748 A1 | 11/2007 | Ferragina et al. | |
| 2008/0059417 A1 | 3/2008 | Yamada et al. | |
| 2008/0243916 A1 | 10/2008 | Liu | |
| 2009/0150336 A1 | 6/2009 | Basu et al. | |
| 2009/0150366 A1 | 6/2009 | Basu et al. | |
| 2009/0150413 A1 | 6/2009 | Basu et al. | |
| 2010/0169354 A1 | 7/2010 | Baby | |

OTHER PUBLICATIONS

Bourret, R. et al., "A Generic Load/Extract Utility for Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Cheng, Josephine et al., "IBM DB2 XML Extender," IEEE, ICDE '00 Conference, San Diego, Feb. 2000, 128 pages.

Chae, Mi-Ok et al., "Design and Implementation of an Object-Oriented Multimedia DBMS Tightly Coupled with Information Retrieval Functions," Proc. 17.sup.th IASTED International Conference on Applied Informatics, Feb. 15-18, 1999, abstract.

Noser, Hansrudi et al., "Dynamic 3D Visualization of Database-Defined Tree Structures on the WWW by Using Rewriting Systems," 2000, IEEE, XP-002262516, pp. 247-254.

Vorthmann, S. et al. "Beyond Schemas, Schema Adjuncts and the Outside World," Markup Languages, Online!, vol. 2, No. 3, Jun. 2000, pp. 1-8.

Daniele Braga et al., "A Graphical Environment to Query XML Data with Query," Proceedings of the Fourth International Conference on Web Information Systems Engineering (WISE '03), 2003, IEEE, 10 pages.

Lo et al., "XAS: A System for Accessing Componentized, Virtual XML Documents," IEEE, 2001, pp. 493-502.

Zisman et al., "Using XML to Build Consistency Rules for Distributed Specifications," Proceedings of the Tenth International Workshop on Software Specification and Design (IWSD'00), IEEE 2000, 8 pages.

Myllymaki, Jussi, "Effective Wed data Extraction with Standard XML Technologies," WWW10, May 1-5, 2001, pp. 689-696.

Schmidt et al., "Why and How to Benchmark XML Databases," SIGMOND Record, vol. 3, No. 3, Sep. 2001, pp. 27-32.

McHugh, Jason et al., "Query Optimization for XML", XP-002333353, Proceedings of the 25.sup.th VLDB Conference (1999) pp. 315-326.

Yoshikawa, Masatoshi et al., "XRel: A Path-Based Approach to Storage and Retrieval of XML Documents Using Relational Databases", XP-001143686, ACM Transactions on Internet Technology (2001), pp. 110-141.

Diao, Y. et al., "Path Sharing and Predicate Evaluation for High-Performance XML Filtering" XP-002344354 ACM Transactions on Database Systems (2003), pp. 467-516.

Diao, Y. et al., "YFilter: Efficient and Scalable Filtering of XML Documents" IEEE (2002) 2 pages.

Helmer, S. et al., "Optimized Translations of XPath into Algebraic Expressions Parameterized by Programs Containing Navigational Primitives" IEEE (2002) 10 pages.

Cooper, Brian F. et al., "A Fast Index for Semistructured Data," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

Kudrass, Thomas, "Management of XML Documents Without Schema in Relational Database Systems," Information and Software Technology, vol. 44, No. 4, Mar. 31, 2002, XP-004347776, pp. 269-275.

Zhang, Wansong, et al., "An Encoding Scheme for Indexing XML Data," E-Commerce and E-Service, 2004, XP-010697639, pp. 526-529.

"XML Fragment Interchange" W3C (1998) pp. 1-16.

W3C, "XML Fragment Interchange," W3C Working Draft, Jun. 30, 1999, XP-002167090, 17 pages.

MacKenzie, David et al., "Finding Files", GNU Findutils Version 4.1.2, Nov. 1994, 38 pages.

"Notice of Allowance and Fee Due" received in U.S. Appl. No. 10/944,170 dated Apr. 7, 2008, 8 pages.

Priti, Patil et al., "Holistic Schema Mappings for XML-on-RDBMS", Database systems for advanced applications, vol. 3882, Lecture notes in Computer Science, Springer-Verlag, Jan. 1, 2006, 16 pages.

Hammerschmidt, B C et al., "Autonomous Index Optimization in XML Databases", 21.sup.st International Conference on Data Engineering, XP010924124, IEEE, Apr. 5, 2005, 10 pages.

Zhen Hua Liu, et al., "XML Table Index—An Efficient Way of Indexing and Querying XML Property Data," 1-4244-0803-2/07/, 2007, IEEE, pp. 1194-1203.

U.S. Appl. No. 12/346,327, filed Dec. 30, 2008, Office Action, Mailing date May 5, 2011.

U.S. Appl. No. 12/346,327, filed Dec. 30, 2008, Final Office Action, mailed Oct. 20, 2011.

* cited by examiner

INDEXING STRATEGY WITH IMPROVED DML PERFORMANCE AND SPACE USAGE FOR NODE-AWARE FULL-TEXT SEARCH OVER XML

RELATED APPLICATIONS

The present application is related to U.S. patent application Ser. No. 12/346,327, titled An Indexing Mechanism for Efficient Node-Aware Full-Text Search Over XML, filed by Thomas Baby, Zhen Liu, and Wesley Lin on Dec. 30, 2008, the entire contents of which are incorporated herein by reference.

U.S. patent application Ser. No. 10/884,311, entitled Index For Accessing XML Data, filed on Jul. 2, 2004, (hereinafter the "XML Index application"), describes various embodiments of an index that may be used to efficiently access XML documents managed by a relational database server, based on XPath queries. Such an index shall be referred to herein as an XML index. The entire contents of the XML Index application are incorporated herein by reference.

Virtual columns are described in U.S. patent application Ser. No. 11/951,918, "Expression Replacement In Virtual Columns," filed by Subhransu Basu and Harmeek Singh Bedi; Ser. No. 11/951,890, "Virtual Columns," filed by Subhransu Basu and Harmeek Singh Bedi; and Ser. No. 11/951,933, "Partitioning In Virtual Columns," filed by Subhransu Basu, Harmeek Singh Bedi, and Ananth Raghavan. The entire contents of these three patent applications about virtual columns are incorporated herein by reference.

FIELD OF THE INVENTION

The present invention relates to a method for creating a full-text XML index to perform an efficient node-aware search over XML documents.

BACKGROUND

As extensible Markup Language ("XML") becomes mainstream, it is becoming more difficult to find relevant information from within the growing collections of XML documents. One way of finding information, which has been sufficient in the past for small collections of XML documents, is to perform a full scan of all XML documents in a collection. While a full scan of all documents can be used to find information within the collection, the implementation would be very slow for larger collections due to the scanning of irrelevant documents and irrelevant portions of these documents. Even for smaller collections, a full scan does not allow the user to target his or her search to a particular context. In other words, a full scan will provide all results for any instance of a keyword in the collection of documents instead of providing relevant results in relevant portions of relevant documents.

Another way to find information within the collection involves the use of text keywords. Specifically, many database systems support text indexes that can be queried for certain keywords. However, this technique can only be used to find a small subset of text within the collection of XML documents.

There is a need for an efficient and complete method to perform node-aware full-text searches over XML documents in existing database systems. Current methods for searching XML documents are inefficient, incomplete, provide irrelevant results, and/or search irrelevant documents and irrelevant portions of these documents.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Fully Atomized Value Approach

Techniques are provided for searching within a collection of XML documents. Paths, values, and order information of the collection of XML documents are indexed in a type of index referred to herein as an XML Index. A table in the XML Index stores an entry for each node of a set of nodes in a collection of XML documents. In a first embodiment of a "fully atomized value" approach, each entry includes the atomized value of the node, a hierarchical order key, and a path identifier. The atomized value of the node includes the text value of the node and the text values of descendant text nodes of that node. A full-text index is created on the value column of the table.

In a second embodiment of the fully atomized value approach, each entry stores the text value of the node, a hierarchical order key, and a path identifier. In the second embodiment, a virtual column is defined to represent, for each node, the atomized value of the node. A full-text index is created on the virtual column.

In the first and second embodiments of the fully atomized value approach, a query performing full-text search over XML is transformed to a SQL query on the table while making use of the full-text index. When the table is modified, an affected portion of the full-text index is updated.

Overview of Partially Atomized Value Approach

As in the fully atomized value approach, the table in the XML Index in a "partially atomized value" approach stores an entry for each node of a set of nodes in a collection of XML documents. Each entry includes the hierarchical order key and the path identifier. In the partially atomized value approach, for a simple node, the entry includes the atomized value of the node. The entry for a complex node contains a null value instead of the atomized value of the node. For a complex node with a descendant text node, i.e. for a mixed content node, a separate entry is stored for the text node. The separate entry contains the atomized value of the text node.

A full-text index is created on the value column of the table. A query performing full-text search over XML is transformed to a SQL query on the table while making use of the full-text index. A phrase search may be performed by checking the hierarchical information and text value information for adjacent nodes that each match part of the phrase.

The XML Index

According to one embodiment of the fully atomized value approach and the partially atomized value approach, an XML Index is used to index paths, values, and order information in the collection of XML documents. In the fully atomized value approach and the partially atomized value approach, the full-text index may be created on the value column of the Path Table in the XML index. In another embodiment of the fully atomized value approach, the full-text index may be created on a virtual column representing the atomized value of the nodes in the XML index. Therefore, a detailed explanation of the XML Index is provided in this section and several of the following sections.

An XML index as described in the XML Index application entitled Index for Accessing XML Data, incorporated by reference in the RELATED APPLICATIONS section above, may be used to process XPath queries regardless of the format and data structures used to store the actual XML data (the "base structures"). For example, the actual XML data can reside in structures within or outside of a database, in any form, such as CLOB (character large object storing the actual XML text), O-R (object relational structured form in the presence of an XML schema), or BLOB (binary large object storing some binary form of the XML data).

According to one embodiment, an XML index is a domain index that improves the performance of queries that include XPath-based predicates and/or XPath-based fragment extraction. An XML index can be built, for example, over both XML Schema-based as well as schema-less XMLType columns which are stored either as CLOB or structured storage. In one embodiment, an XML index is a logical index that results from the cooperative use of a path index, a value index, and an order index.

The path index provides the mechanism to lookup nodes based on simple (navigational) path expressions. The value index provides the lookup based on value equality or range. There could be multiple secondary value indexes—one per datatype. The order index associates hierarchical ordering information with indexed nodes. The order index is used to determine parent-child, ancestor-descendant and sibling relationships between XML nodes.

When the user submits a query involving XPaths (as predicate or fragment identifier), the XPath statement is decomposed into a SQL query that accesses the XML index table. The generated query typically performs a set of path, value and order-constrained lookups and merges their results appropriately.

For the purpose of explanation, the techniques described herein are described in a context in which an XML index, as described in the XML Index application, is used to index the XML documents. However, the techniques described herein are not limited to any specific index structure or mechanism, and can be used to identify and extract valid self-contained XML fragments regardless of what method of querying is used.

The Path Table

A logical XML index includes a Path Table and a set of secondary indexes. As mentioned above, each indexed XML document may include many indexed nodes. The Path table contains one row per indexed node. For each indexed node, the row in the Path table for the node contains various pieces of information associated with the node.

According to one embodiment, the information contained in the Path table includes (1) a Path ID that indicates the path to the node, (2) "location data" for locating the fragment data for the node within the base structures that store XML documents, and (3) "hierarchy data" that indicates the position of the node within the structural hierarchy of the XML document that contains the node. Optionally, the Path table may also contain value information for those nodes that are associated with values.

Relevant features of the Path Table, namely paths, path expressions, path IDs, location data, hierarchical order key, and value information, are discussed in more detail in the following sections. A brief discussion of the various node types relevant to the partially atomized value approach follows the sections describing the relevant features of the Path Table. Then, the fully atomized value approach and the partially atomized value approach are discussed with reference to these relevant concepts.

Paths

The structure of an XML document establishes parent-child relationships between the nodes within the XML document. The "path" for a node in an XML document reflects the series of parent-child links, starting from a "root" node, to arrive at the particular node.

The following sample XML document, ContactList.xml, is provided for the purposes of explanation:

```
ContactList.xml
<CONTACTS>
  <CONTACT>JIM REYNOLDS</CONTACT>
  <CONTACT>JOHN H. SMITH
    <LASTNAME>SMITH</LASTNAME>
    <FIRSTNAME>JOHN</FIRSTNAME>
  </CONTACT>
  <CONTACT>JOE THOMAS</CONTACT>
</CONTACTS>
```

Figure 1:
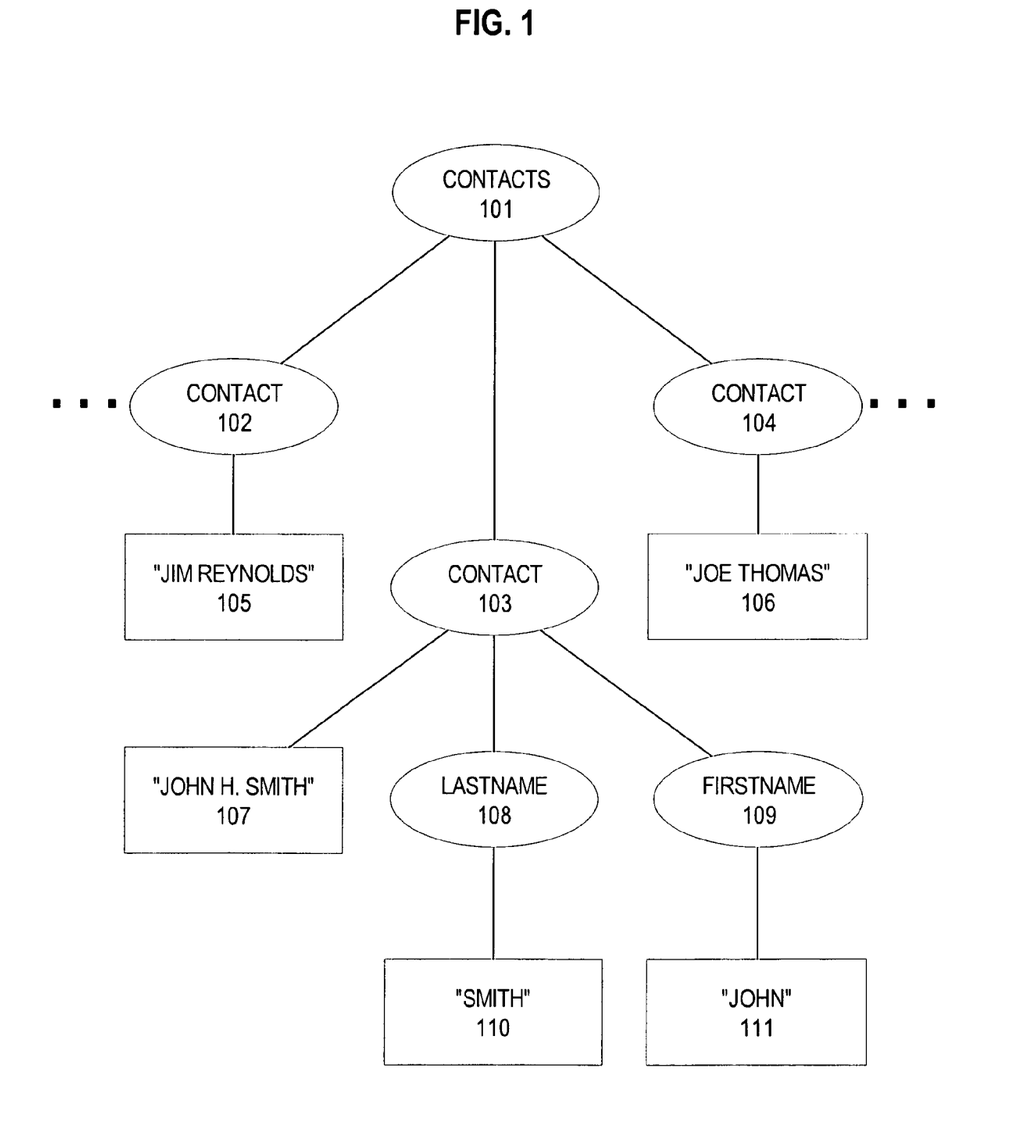
FIG. 1 is a diagram illustrating a conceptual arrangement of a sample set of nodes that can be indexed and searched.

As seen above, ContactList.xml contains nodes named CONTACTS, CONTACT, LASTNAME, and FIRSTNAME. FIG. 1 represents a diagram of the node form of ContactList.xml. As can be seen above in ContactList.xml and in FIG. 1, the path to the "LASTNAME" node in ContactList.xml is /CONTACTS/CONTACT/LASTNAME, since the "LASTNAME" node is a child of the "CONTACT" node, and the "CONTACT" node is a child of the "CONTACTS" node.

The set of XML documents that an XML index indexes is referred to herein as the "indexed XML documents". According to one embodiment, an XML index may be built on all of the paths within all of the indexed XML documents, or a subset of the paths within the indexed XML documents. Techniques for specifying which paths are indexed are described hereafter. The set of paths that are indexed by a particular XML index are referred to herein as the "indexed XML paths".

Path Expressions

XML documents may be searched by using an XML query language such as XQuery/XPath. XML Query Language ("XQuery") and XML Path Language ("XPath") are important standards for querying data in XML documents. The primary syntactic construct in XPath is an expression, which is evaluated to yield an object. A path expression is a representation of a path.

Path IDs

Each of the indexed XML paths is assigned a unique path identifier ("Path ID"). For example, the paths that exist in ContactList.xml may be assigned Path IDs as illustrated in the following table:

| PATH ID | PATH |
| --- | --- |
| 1 | /CONTACTS |
| 2 | /CONTACTS/CONTACT |
| 3 | /CONTACTS/CONTACT/LASTNAME |
| 4 | /CONTACTS/CONTACT/FIRSTNAME |

Various techniques may be used to identify paths and assign Path IDs to paths. For example, a user may explicitly enumerate paths, and specify corresponding Path IDs for the paths thus identified. Alternatively, the database server may parse each XML document as the document is added to the set of indexed XML documents. During the parsing operation, the database server identifies any paths that have not already been assigned a Path ID, and automatically assigns new Path IDs to those paths. The Path-ID-to-path mapping may be stored within the database in a variety of ways. According to one embodiment, the Path-ID-to-path mapping is stored as metadata separate from the XML indexes themselves.

The same access structures may be used for XML documents that conform to different schemas. Because the indexed XML documents may conform to different schemas, each XML document will typically only contain a subset of the paths to which Path IDs have been assigned.

Location Data

The location data associated with a node indicates where the XML document that contains the node resides within the base structures. The nature of the location data will vary from implementation to implementation based on the nature of the base structures. Depending on how the actual XML document is stored, the location data may also include a locator or logical pointer to point into the XML document. The logical pointer may be used for extracting fragments that are associated with nodes identified by XPaths.

For the purpose of explanation, it shall be assumed that (1) the base structures are tables within a relational database, and (2) each indexed XML document is stored a corresponding row of a base table. In such a context, (1) the location data for a node may include, for example, (1) the row ID of a row, within the base table, in which the XML document containing the node is stored, and (2) a locator that provides fast access within the XML document, to the fragment data, that corresponds to the node.

Hierarchical Order Key

The Path Table row for a node also includes information that indicates where the node resides within the hierarchical structure of the XML document containing the node. Such hierarchical information includes the order key of the node.

The hierarchical order information may be represented using a Dewey-type value. Specifically, the order key of a node may be created by appending a value to the order key of the node's immediate parent, where the appended value indicates the position, among the children of the parent node, of that particular child node.

For example, assume that a particular node D is the child of a node C, which itself is a child of a node B that is a child of a node A. Assume further that node D has the order key 1.2.4.3. The final "3" in the order key indicates that the node D is the third child of its parent node C. Similarly, the 4 indicates that node C is the fourth child of node B. The 2 indicates that Node B is the second child of node A. The leading 1 indicates that node A is the root node (i.e. has no parent).

As mentioned above, the order key of a child may be easily created by appending to the order key of the parent a value that corresponds to the number of the child. Similarly, the order key of the parent is easily derived from the OderKey of the child by removing the last number in the order key of the child.

The composite numbers represented by each order key may be converted into byte-comparable values, so that a mathematical comparison between two order keys indicates the relative position, within the structural hierarchy of an XML document, of the nodes to which the order keys correspond.

For example, the node associated with the order key 1.2.7.7 precedes the node associated with the order key 1.3.1 in the hierarchical structure of an XML document. Thus, the database server uses a conversion mechanism that converts order key 1.2.7.7 to a first value, and to convert order key 1.3.1 to a second value, where the first value is less than the second value. By comparing the second value to the first value, the database server can easily determine that the node associated with the first value precedes the node associated with the second value. Various conversion techniques may be used to achieve this result.

Value Information

Nodes within an indexed document may be attribute nodes or nodes that correspond to simple elements. For attribute nodes and simple elements, the Path Table row also stores the actual value of the attributes and elements. Such values may be stored, for example, in a "value column" of the Path Table.

Value information can be stored as a BLOB (Binary Large Object), CLOB (Character Large Object), or RAW (maximum size 2000 bytes) format. In order for the value column to store large text values, the value column would need to be stored in the BLOB or CLOB format. In one embodiment, the full-text value of an attribute or element is stored as a BLOB or CLOB in the value column.

An example Path Table for ContactList.xml is provided for purposes of explanation:

| ROWID | DOCID | PATHID | ORDER KEY | VALUE |
| --- | --- | --- | --- | --- |
| 1 | 1 | 1 | 1 | |
| 2 | 1 | 2 | 1.1 | JIM REYNOLDS |
| 3 | 1 | 2 | 1.2 | JOHN H. SMITH |

-continued

| ROWID | DOCID | PATHID | ORDER KEY | VALUE |
|---|---|---|---|---|
| 4 | 1 | 3 | 1.2.1 | SMITH |
| 5 | 1 | 4 | 1.2.2 | JOHN |
| 6 | 1 | 2 | 1.3 | JOE THOMAS |

In ContactList.xml, represented in node form by the diagram in FIG. 1, the value column for the <CONTACT> node with order 1.1 contains "JIM REYNOLDS." As used herein, a particular node "contains" a value when the value is stored either in text nodes immediately under the particular node or in text nodes of any descendant element nodes of the particular node. For example, the value column for the <CONTACT> node with order 1.3 contains "JOE THOMAS." The value column for the <CONTACT> node with order 1.2, unlike the other <CONTACT> nodes, contains a text value, descendant element nodes, and descendant text nodes. As such, the <CONTACT> node with order 1.2 is called a "mixed content node" because the node contains child nodes of more than one type. The text value is also called a "text node," and the descendant elements are also called "descendant element nodes."

There are various ways to store node values in the path table of the XML Index, each of which affects the usefulness of the index for full text searches. For example, the value column for mixed content nodes can store only the child text node. In this approach, the value column for the <CONTACT> node with order 1.2 (row 3) would store "JOHN H. SMITH." In this approach, the value entry of "JOHN H. SMITH" fails to indicate the values of descendant element nodes. If instead of "JOHN H. SMITH," the text node under <CONTACT> contained "X," then a search for "JOHN" on row 3 alone would fail to indicate that "JOHN" appears under <FIRSTNAME>, which is a child of <CONTACT> in ContactList.xml. Thus, the first approach does not allow a complete full-text search to be performed over the XML content in the table.

In a second approach, the value column for mixed content nodes stores text nodes of only descendant element nodes. In the second approach, the value column of row 3 stores "SMITH JOHN." A search on the value column of row 3 for "JOHN H. SMITH" would fail to indicate that "JOHN H. SMITH" appears under <CONTACT> in row 3 of ContactList.xml. Like the first approach, the second approach does not allow a complete full-text search to be performed over the XML content in the table.

In a third approach, the value column for a complex node stores a NULL value. A complex node is a node with a descendant element or attribute node. The set of mixed content nodes is a subset of the set of complex nodes. In the third approach, the value column of row 3 stores [NULL]. A search of row 3 for "JOHN H. SMITH" would fail to indicate that "JOHN H. SMITH" appears under <CONTACT> in row 3 of ContactList.xml. Like the first two approaches, the third approach does not allow a complete full-text search to be performed over the XML content in the table.

Node Types

Because different node types are relevant to the following discussion of the fully atomized value approach and the partially atomized value approach, a brief explanation of the relevant node types is provided with reference to FIG. 1. FIG. 1 illustrates simple, complex, and mixed content nodes. Referring to FIG. 1, nodes 101, 102, 103, 104, 108, and 109 are element nodes. Nodes 108 and 109 could also be written as attribute nodes of node 103, but ContactList.xml lists all nodes as element nodes for simplicity. If nodes 108 and 109 were written as attribute nodes, the code snippet may appear as follows: <CONTACT LASTNAME="SMITH" FIRSTNAME="JOHN">JOHN H. SMITH</CONTACT>. In the snippet, JOHN H. SMITH represents text node 107 stored under element node 103. Nodes 105, 106, 107, 110, and 111 are text nodes. The text nodes contain the text values of the element nodes.

Nodes 102, 104, 108, and 109 are simple element nodes because they each only have one child text node, 105, 106, 110, and 111, respectively. Node 101 is a complex element node with several element nodes 102, 103, and 104 as children. Node 103 is also a complex element node. Node 103 has as children two element nodes 108 and 109 and one child text node 107. Because node 103 is a complex element node with a child text node 107, node 103 is also called a mixed content node.

Fully Atomized Value Approach

A fully atomized value approach allows a full-text search to be performed over the XML content in the table. In the fully atomized value approach, the value column of the path table stores the atomized value of the node. The atomized value is the combined value of the node and all descendant text nodes of the node. The atomized value is obtained by evaluating //text( ) on a node, which combines the value of the node with all descendant text nodes of the node. In one embodiment, the text value of the node is concatenated with all descendant text nodes of the node to form the atomized value. The order key, i.e. hierarchy data, can be used to determine the descendants of the node.

The function //text( ) concatenates the text value of a given node with the text values of descendants of the given node. In one embodiment, text values of descendant nodes of the given node are concatenated in order according to the order keys of the descendant nodes. For example, evaluating //text( ) on a given node with an order key of 1 would cause text values of nodes with order keys of 1.1, 1.2, 1.2.1, 1.2.2, and 1.3 to be concatenated in order as indicated.

If, for example, the searched node has an order key of 1, then nodes with order keys 1.X, 1.X.Y, etc. are descendants of the searched node. The table below indicates that rows 4 and 5 are both descendants of row 3 because the order keys for rows 4 and 5 begin with the order key for row 3.

In the fully atomized value approach, the value column of row 3 stores "JOHN H. SMITH SMITH JOHN." In the example, "SMITH" is appended to "JOHN H. SMITH" because the text value for <LASTNAME> is a descendant text node of <CONTACT>. Similarly, "JOHN" is appended to "JOHN H. SMITH SMITH" because the text value for <FIRSTNAME> is a descendant text node of <CONTACT>. An example Path Table for the fully atomized value approach is provided:

| ROWID | DOCID | PATHID | ORDER KEY | VALUE |
|---|---|---|---|---|
| 1 | 1 | 1 | 1 | JIM REYNOLDS JOHN H. SMITH SMITH JOHN JOE THOMAS |
| 2 | 1 | 2 | 1.1 | JIM REYNOLDS |
| 3 | 1 | 2 | 1.2 | JOHN H. SMITH SMITH JOHN |

-continued

| ROWID | DOCID | PATHID | ORDER KEY | VALUE |
|---|---|---|---|---|
| 4 | 1 | 3 | 1.2.1 | SMITH |
| 5 | 1 | 4 | 1.2.2 | JOHN |
| 6 | 1 | 2 | 1.3 | JOE THOMAS |

Note that, under the fully atomized value approach, duplicative data is stored in row 1 and row 3. In the fully atomized value approach, the root node stores the combined value of the root node and all descendant text nodes of the root node. Because every node in the Path Table above is a descendant of the node represented by row 1, the value column for row 1 stores the concatenation of every text node in the Path Table.

To facilitate fast search times, a full-text index is created on the atomized value of the value column in the table. The user submits a query, for example, by using XPath. A query performing full-text search over XML is transformed to a SQL query on the table while making use of the full-text index. When the table is modified, an affected portion of the full-text index is updated.

A search on the value column of row 3 would correctly find text values in <CONTACT> and text values in any descendant text node of <CONTACT>. Thus, searches for "JOHN H. SMITH," "SMITH," "JOHN," and "SMITH JOHN" in row 3 would all indicate that those strings appear in row 3 as it appears above and in ContactList.xml.

Partially Atomized Value Approach

In a partially atomized value approach, the value column for a node stores the atomized value of the node unless the node is a complex node. If the node is a complex node, then the value column stores the NULL value. If the node is a complex node that is also a mixed content node, then the value column stores, as a separate entry, a text node for the mixed content node. Unlike the fully atomized value approach, the partially atomized value approach avoids duplicative storage of data and provides better DML performance. However, the partially atomized value approach may be slower at search time if the user is searching for a phrase.

In the partially atomized value approach, the value column of row 3 stores [NULL], and a separate row 4 is added to the Path Table. When a text node is added to the Path Table, a separate row needs to be inserted after the mixed content node that is a parent of the text node. The separate row for the text node can include some of the same information as the row for the mixed content node. In the example below, the separate row 4 stores "JOHN H. SMITH," the value of the text node under the mixed content <CONTACT> node. An example Path Table for the partially atomized value approach is provided:

| ROWID | DOCID | PATHID | ORDER KEY | VALUE |
|---|---|---|---|---|
| 1 | 1 | 1 | 1 | [NULL] |
| 2 | 1 | 2 | 1.1 | JIM REYNOLDS |
| 3 | 1 | 2 | 1.2 | [NULL] |
| 4 | 1 | 2 | 1.2.1 | JOHN H. SMITH |
| 5 | 1 | 3 | 1.2.2 | SMITH |
| 6 | 1 | 4 | 1.2.3 | JOHN |
| 7 | 1 | 2 | 1.3 | JOE THOMAS |

If a search is performed on a node with a [NULL] value in the partially atomized value approach, the search is iterated over the descendant nodes of the searched node. The descendant nodes of the searched node can be determined using the order key. If the searched node has an order key of 1, then nodes with order keys 1.X, 1.X.Y, etc. are descendants of the searched node. The table above indicates that rows 4, 5, and 6 are all descendants of row 3 because the order keys for rows 4, 5, and 6 begin with the order key for row 3.

In the partially atomized value approach, like the fully atomized value approach, a search on the value column of row 3 would correctly find text values in <CONTACT> and text values in any descendant text node of <CONTACT>. Thus, searches for "JOHN H. SMITH," "SMITH," "JOHN," and "SMITH JOHN" in row 3 would all indicate that the those strings appear in row 3 as it appears above and in ContactList.xml.

To speed up search times, a full-text index is created on the value column in the table. The user submits a query, for example, by using XPath. A query performing full-text search over XML is transformed to a SQL query on the table while making use of the full-text index. When the table is modified, an affected portion of the full-text index is updated.

The partially atomized value approach provides better DML performance by setting up a manageable and low cost technique for storing value information from XML documents. For example, when the text node under <FIRSTNAME> or <LASTNAME> in ContactList.xml is modified under the fully atomized value approach, the atomized values for rows 1 and 3 are recalculated. With large node trees and large atomized values, this computation greatly slows down an update of the table and index for the fully atomized value approach. However, a similar modification under the partially atomized value approach would not require a recalculation of row 1 or row 3. Only the value of the modified text node is recalculated.

Using Virtual Column in Fully Atomized Value Approach

Under the fully atomized value approach, instead of storing an actual column of materialized concatenated values in the Path Table, a virtual column can be defined to represent the concatenation of values from the value column of the Path Table. A virtual column is a derived, or computed, column, which may or may not be materialized on a disk.

The virtual column is based on the value and order key columns of the Path Table. When computing a query that references or otherwise accesses the virtual column, the virtual column is computed on the fly based on the virtual column's definition. The atomized value of a node can be computed by concatenating the value entry of the node with the value entries of descendant text nodes of the node. As used herein, a virtual column is said to "contain" data based on the definition of the virtual column even though the data is not actually stored in the virtual column.

Because no separate data is stored for the virtual column, the virtual column saves space that would otherwise be wasted to the duplicative storage of concatenated values. However, the virtual column is evaluated when the virtual column is accessed (e.g., referenced in the query). The virtual column is accessed to create and modify the full-text index. Once the full-text index is created or modified, computed values from the virtual column are not retained.

Full-Text Search in Fully Atomized Value Approach

A user can submit a query performing full-text search over XML. The query performing full-text search over XML is transformed to a SQL query on the Path Table. The SQL query is completed using the full-text index. A SQL predicate in the rewritten query constrains the rewritten query to table rows matching the full-text search criterion. The SQL predicate uses the full-text index on the VALUE column.

In the fully atomized value approach, an example search query expression, '/books/book/title ftcontains "dog"' is rewritten to the following sub-query:

```
exists (select 1
    from "path_table" PT
    where FULL_TEXT_CONTAINS (PT.VALUE, "dog") = 1
    and PT.PATHID = GET_PATHID_FROM_PATH
    ("/books/book/title")
    );
```

Here, "path_table" is the name of the path table that stores path, hierarchy, and value information for a collection of XML documents. FULL_TEXT_CONTAINS is a SQL operator that performs full-text search on its first argument. GET_PATHID_FROM_PATH is a SQL function that converts a path to its path-id. The presence of FULL_TEXT_CONTAINS in the transformed query provides the cost-based optimizer with the option of making use of the full-text index on the value column.

The sub-query provided returns 1 if there is at least one row of the Path Table that contains the keyword, "dog," and falls under the path "/books/book/title." The subquery returns 0 if no row of the Path Table contains the keyword under the path. A row that contains a given keyword and falls under a given path can be called a matching row. The sub-query can easily be rewritten to return an order key identifying the hierarchical position of the matching row within the collection of XML documents, a doc ID identifying the XML document containing the matching row, or other information useful to the searcher.

The query performing a full-text search may use the Path ID when complete or partial knowledge of the path of the node is available. The order key stored in the order key column is used when the XPath in the query uses wildcards, represented by *. An example XPath with wildcards is /books/*/title. The search context for this XPath is represented by the diagram in FIG. 2.

Figure 2:
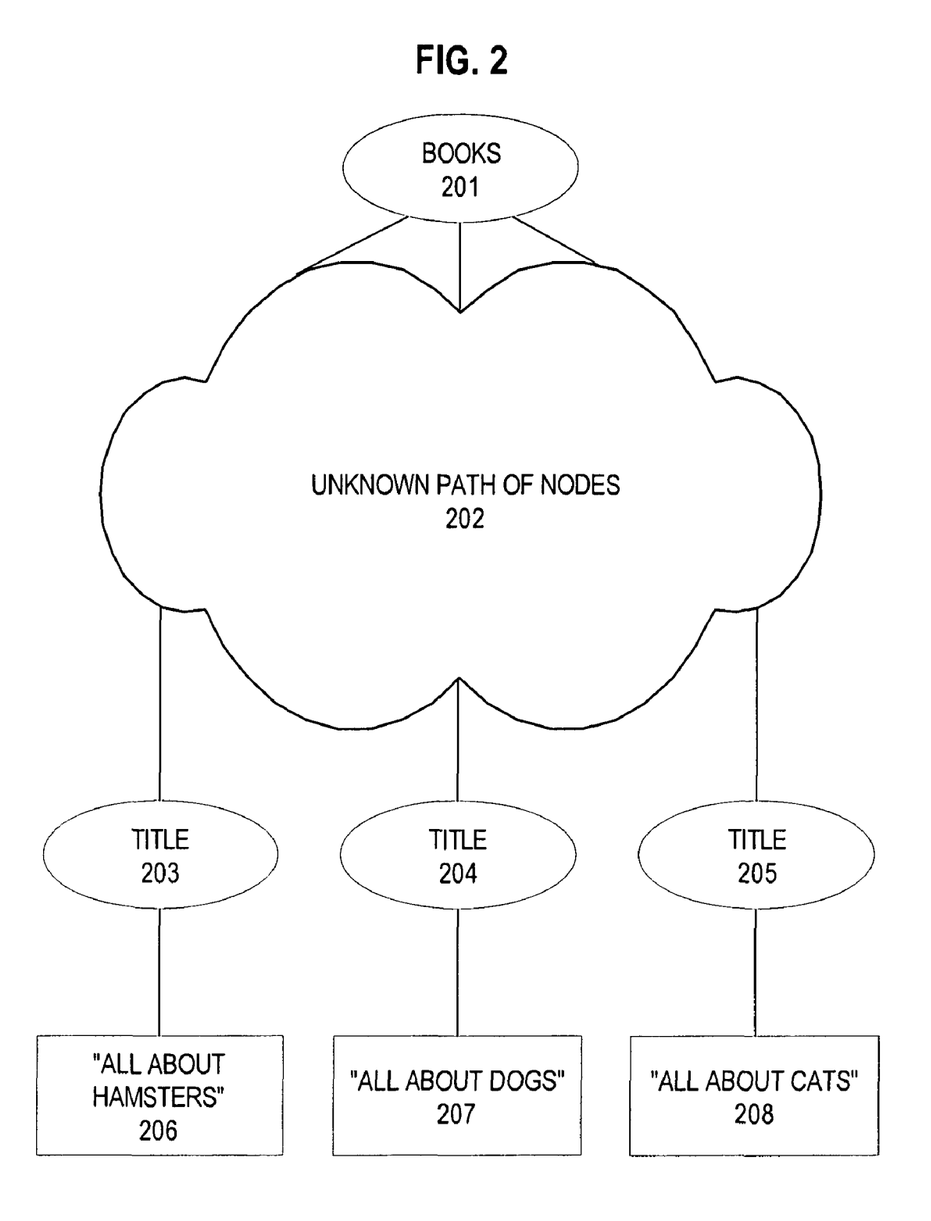
FIG. 2 is a diagram illustrating a conceptual arrangement of a sample set of nodes within a search context where a partial path or a partial hierarchy is given.

FIG. 2 shows root node 201 followed by an unknown path of nodes 202. At the end of the unknown path of nodes 202 are known nodes 203, 204, and 205. Known nodes 203, 204, and 205 have text values 206, 207, and 208, respectively. The text values 206, 207, and 208 for nodes 203, 204, and 205 can be searched using the XPath/books/*/title.

In the fully atomized value approach, a node-aware full-text search can be efficiently performed. In a node-aware search, a search is performed on specific path(s) or hierarchical position(s) rather than on the entire XML document or collection of documents. The fully atomized value approach, unlike a full scan of XML documents, provides node-awareness. The fully atomized value approach, unlike the partially atomized value approach, uses the materialization of the result of evaluating //text( ) for each element in an XML document, which causes a high storage overhead and can be time consuming to maintain. On the other hand, the fully atomized value approach easily supports phrase search. If the atomized values are stored as a concatenation of adjacent descendant node values, then a search for a phrase within the atomized values reveals phrases that from several adjacent descendant nodes.

Full-Text Search Using Partially Atomized Value Approach

A query performing full-text search over XML is transformed to a SQL query on the table described above. A SQL predicate in the rewritten query constrains the rewritten query to table rows matching the full-text search criterion. The SQL predicate uses the full-text index on the VALUE column. In the partially atomized value approach, for example, the expression '/books/book/title ftcontains "dog"' is rewritten to the following sub-query: exists (select 1

```
from "path_table" PT
where PT.PATHID = GET_PATHID_FROM_PATH
    ("/books/book/title") and exists (select 1
    from "path table" PTD
        where FULL_TEXT_CONTAINS (PTD.VALUE, "dog") = 1 and
        PTD.ORDER KEY >= PT.ORDER KEY and
        PTD.ORDER KEY <
MAX_DESC_ORDER KEY (PT.ORDER KEY) and
        PTD.ROWID = PT.ROWID
    )
);
```

Here, "path table" is the name of the table that stores as rows the paths and values in an XML document. FULL_TEXT_CONTAINS is a SQL operator that performs full-text search on the SQL operator's first argument. GET_PATHID_FROM_PATH is a SQL function that converts a path to the path's path-id. MAX_DESC_ORDER KEY is a SQL operator that returns the maximum possible theoretical value of the order key of a descendant of a node whose order key is the input to the operator. The conditions PTD.ORDER KEY>=PT.ORDER KEY and PTD.ORDER KEY<MAX_DESC_ORDER KEY (PT.ORDER KEY) constrain the node identified by PTD to be either the node identified by PT or a descendant of the node identified by PT. The presence of FULL_TEXT_CONTAINS in the transformed query provides the cost-based optimizer the option of making use of the full-text index on the VALUE column. If we know from metadata information such as XML schema that the path "/books/book/title" maps to a simple element, then the rewritten query can be simplified as shown below.

```
exists (select 1
    from "path_table" PT
    where PT.PATHID = GET_PATHID_FROM_PATH
    ("/books/book/title") and
    FULL_TEXT_CONTAINS (PTD.VALUE, "dog") = 1
    );
```

Under the partially atomized value approach, a node-aware full-text search can be efficiently performed without materializing the result of //text( ) for each complex node. Therefore, the partially atomized value approach has better DML performance and uses less storage space than the fully atomized value approach.

Phrase Search Using Partially Atomized Value Approach

Unlike the fully atomized value approach, the partially atomized value approach, without more, does not find a searched phrase if the words in the phrase appear in adjacent nodes. To implement a phrase search with the partially atomized value approach, the phrase can be broken up into parts. If each part of the phrase is found among the nodes, a determination can be made based on the hierarchical information of the matching nodes whether the matching nodes are adjacent. If the matching nodes are adjacent, then the phrase may exist as a whole within the search context. If the matching nodes are not adjacent, then the phrase does not exist as a whole within the search context. For example, if a first adjacent node contains "John" and a second adjacent node contains "Smith," then the phrase "John Smith" may be present in the nodes.

If the matching nodes are adjacent, a further determination can be made based on location information of the text of the adjacent nodes. A text value for a first adjacent node and a text value for a second adjacent node can be used to determine whether the keyword exists in the atomized values of adjacent text in the adjacent nodes. For example, if a first adjacent node contains "John X Y Z" and a second adjacent node contains "Smith," then the phrase "John Smith" is not present in the two adjacent nodes. Instead, the phrase "John X Y Z Smith" is present in the two adjacent nodes. If, instead, the first adjacent node contains "John" and the second adjacent node contains "Smith X Y Z," then the phrase "John Smith" is present in the two adjacent nodes. The phrase "John Smith X Y Z" is also present in the two adjacent nodes.

Performing phrase search in the partially atomized value approach can be time-consuming. Unlike the fully atomized value approach, the phrase search is not built into the full-text index. In the partially atomized value approach, the order key and text values are used from the Path Table to perform a phrase search. Even though the Path Table is accessed to perform a phrase search, the partially atomized value approach does not require a materialization of the atomized values of all nodes. Using the method described above, combinations of text values are tested when adjacent nodes each match a part of the phrase. For non-phrase searches, the partially atomized value approach provides better DML performance and comparable search performance to the fully atomized value approach.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers represented on the persistent memory mechanism. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to a database language. One non-limiting database language supported by many database servers is SQL, including proprietary forms of SQL supported by such database servers as Oracle, (e.g. Oracle Database 10g). SQL data definition language ("DDL") instructions are issued to a database server to create or configure database objects, such as tables, views, or complex data types.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. The client may use a variety of database applications that run on the database server, or the client may interact directly with the database server using the database language.

Resources from multiple nodes in a multi-node database system can be allocated to running a particular database server's software. Each combination of the software and allocation of the resources from a node is a server that is referred to herein as a "server instance" or "instance".

XML Storage

Various types of storage mechanisms are used to store a XML document. One type of storage mechanism stores a XML document as a text file in a file system. Another type of mechanism for storing XML documents is a database server. In a database server, a XML document may be stored in a row of a table and nodes of the XML document are stored in separate columns in the row. An entire XML document may also be stored in a lob (large object) in a column. A XML document may also be stored as a hierarchy of objects in a database; each object is an instance of an object class and stores one or more elements of a XML document. Tables and/or objects of a database system that hold XML data are referred to herein as base tables or objects.

Database servers may include many mechanisms that allow for powerful and efficient ways to query large collections of XML documents. Database servers that store XML documents may be enhanced to efficiently perform XML operations using these mechanisms. One such type of XML operation is to execute queries over collections of XML documents using XML query languages, such as XQuery/XPath. XML Query Language ("XQuery") and XML Path Language ("XPath") are important standards for a query language, which can be used in conjunction with SQL to express a large variety of useful queries. The term XML query is used to refer to queries that conform to (1) XQuery, XPath, and/or another XML language standard, (2) SQL queries that may embed XQuery or XPath expressions, (3) queries of other languages, and (4) proprietary dialects of XQuery, XPath, SQL, or XML standard languages.

When a database server receives a XML query, the database server may rewrite the query to refer to the underlying database structures that store the XML data. Such rewrites may include rewriting the query to refer to the data structures (e.g. path table) of the XML index, as previously shown by example.

Hardware Overview

Figure 3:
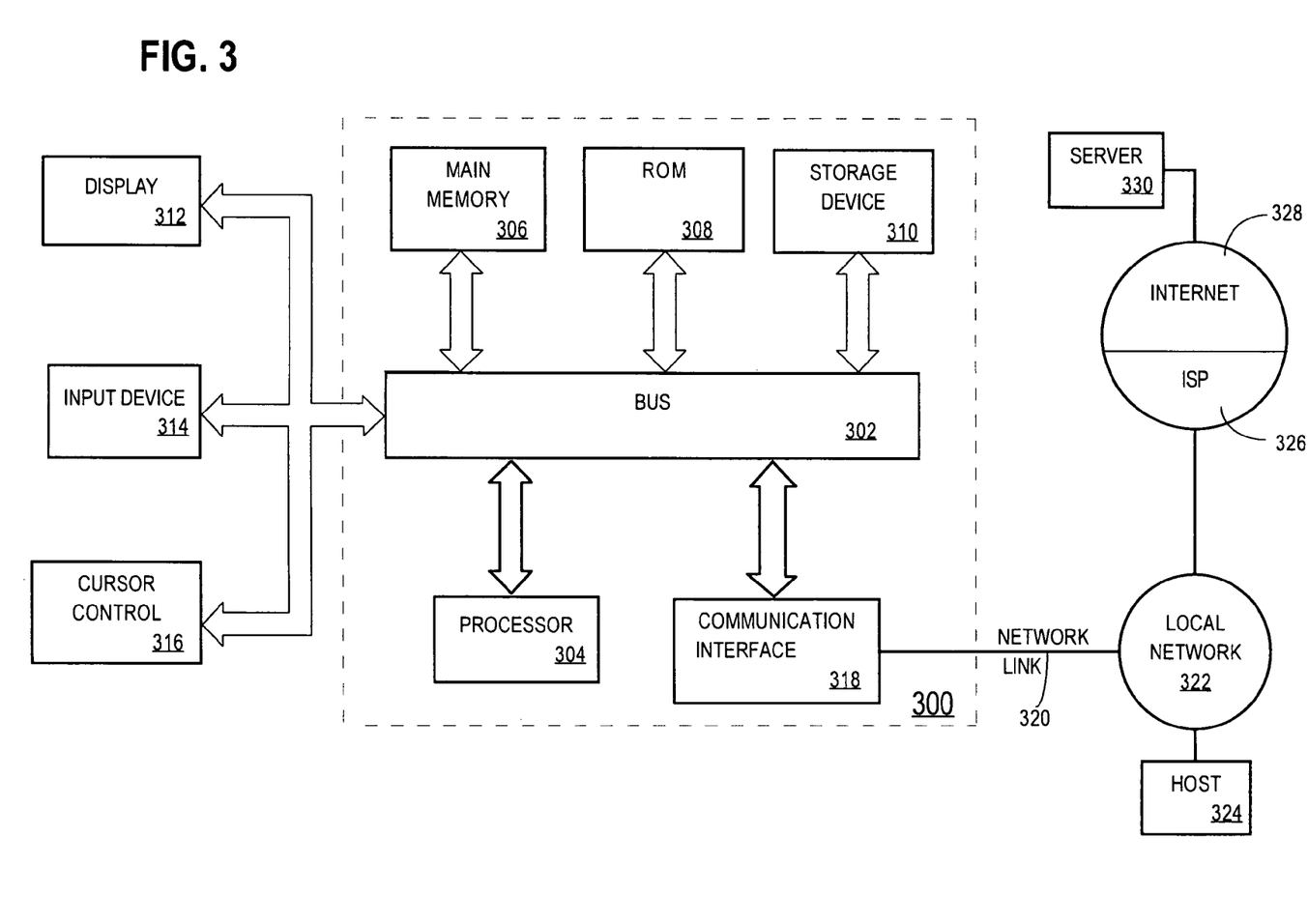
FIG. 3 is a diagram of a system upon which the techniques described herein may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   storing a table that stores data for a plurality of nodes in one or more XML documents, the table comprising an entry for each node of the plurality of nodes, the entry of each node comprising:
      an order key that specifies a hierarchical position of the node within the one or more XML documents;
      an indication of a name of the node;
   wherein the table comprises at least a first entry for a first node and a second entry for a second node, wherein the first node has a first node text value but does not have any descendant nodes, and wherein the second node has a second node text value and has one or more descendant nodes;
   wherein the first entry for the first node comprises the first node text value;
   wherein the second entry for the second node comprises a null node text value;
   the table further comprising a third entry comprising the second node text value; and
   storing an index of the node text values stored in the entries of the table;
   wherein the method is performed by one or more computing devices.

2. The computer-implemented method of claim 1, wherein said node text values are stored in a column of said table, said column being of a character large object type.

3. The computer-implemented method of claim 1, further comprising:
   receiving a query that requires a text search of the one or more XML documents; and
   rewriting said query to produce a rewritten query, wherein said rewritten query is evaluated against the index.

4. The computer-implemented method of claim 1, further comprising:
   receiving a query that specifies certain criteria, said criteria comprising:
      one or more particular node text values; and
      one or more particular node names;
   evaluating the query against the index.

5. The computer-implemented method of claim 4, wherein at least one particular node text value of the one or more particular node text values span across node text values of two or more adjacent nodes, and wherein evaluating the query finds the at least one particular node text value in the two or more adjacent nodes.

6. The computer-implemented method of claim 5, wherein the at least one particular node text value comprises a first part and a second part, further comprising searching for the first part in a first adjacent node and a second part in a second adjacent node to compute whether at least one particular node text value exists in the node text values of the adjacent nodes.

7. The computer-implemented method of claim 4, further comprising rewriting the query to search for one or more indications of the one or more particular node names.

8. A computer-implemented method comprising:
   receiving a query for specified text in one or more XML documents;
   wherein said one or more XML documents comprise a plurality of nodes;
   in response to receiving the query:
      determining that the one or more XML documents are stored in a table comprising a plurality of rows, each row of said plurality of rows corresponding to a node of said plurality of nodes;
      wherein each row of said plurality of rows includes:
         an order key that indicates a hierarchical position of the node within the one or more XML documents, said order key being stored in a first column of said table; and
         an indication of a name of the node, said indication stored in a second column of said table;
      wherein the table comprises at least a first row for a first node and a second row for a second node, wherein the first node has a first node text value but does not have any descendant nodes, and wherein the second node has a second node text value and has one or more descendant nodes;
      wherein the first row for the first node comprises the first node text value;
      wherein the second row for the second node comprises a null node text value;
      the table further comprising a third row comprising the second node text value; and
      searching the node text values stored in the rows of the table for the specified text to determine at least one of a particular order key or a particular name of a particular node that contains the specified text;
   wherein the method is performed by one or more computing devices.

9. The computer-implemented method of claim 8, further comprising determining whether a first part of the specified text exists in a first adjacent node of two or more adjacent nodes, and whether a second part of the specified text exists in a second adjacent node of two or more adjacent nodes.

10. The computer-implemented method of claim 8, further comprising rewriting the query to search for one or more order keys or node names.

11. A volatile or non-volatile computer-readable storage medium storing one or more sequences of instruction, wherein execution of the one or more sequences of instruction by one or more processors causes the one or more processors to perform:
   storing a table that stores data for a plurality of nodes in one or more XML documents, the table comprising an entry for each node of the plurality of nodes, the entry of each node comprising:
      an order key that specifies a hierarchical position of the node within the one or more XML documents;
      an indication of a name of the node;
   wherein the table comprises at least a first entry for a first node and a second entry for a second node, wherein the first node has a first node text value but does not have any descendant nodes, and wherein the second node has a second node text value and has one or more descendant nodes;
   wherein the first entry for the first node comprises the first node text value;
   wherein the second entry for the second node comprises a null node text value;
   the table further comprising a third entry comprising the second node text value; and
   storing an index of the node text values stored in the entries of the table.

12. The volatile or non-volatile computer-readable storage medium of claim 11, wherein said node text values are stored in a column of said table, said column being of a character large object type.

13. The volatile or non-volatile computer-readable storage medium of claim 11, wherein execution of the one or more sequences of instruction by the one or more processors further causes the one or more processors to perform:
receiving a query that requires a text search of the one or more XML documents; and
rewriting said query to produce a rewritten query, wherein said rewritten query is evaluated against the index.

14. The volatile or non-volatile computer-readable storage medium of claim 11, wherein execution of the one or more sequences of instruction by the one or more processors further causes the one or more processors to perform:
receiving a query that specifies certain criteria, said criteria comprising:
one or more particular node text values; and
one or more particular node names;
evaluating the query against the index.

15. The volatile or non-volatile computer-readable storage medium of claim 14, wherein at least one particular node text value of the one or more particular node text values span across node text values of two or more adjacent nodes, and wherein evaluating the query finds the at least one particular node text value in the two or more adjacent nodes.

16. The volatile or non-volatile computer-readable storage medium of claim 15, wherein the at least one particular node text value comprises a first part and a second part, wherein execution of the one or more sequences of instruction by the one or more processors further causes the one or more processors to perform searching for the first part in a first adjacent node and a second part in a second adjacent node to compute whether the at least one particular node text value exists in the node text values of the adjacent nodes.

17. The volatile or non-volatile computer-readable storage medium of claim 14, wherein execution of the one or more sequences of instruction by the one or more processors further causes the one or more processors to perform rewriting the query to search for one or more indications of the one or more particular node names.

18. A volatile or non-volatile computer-readable storage medium storing one or more sequences of instruction, wherein execution of the one or more sequences of instruction by one or more processors causes the one or more processors to perform:
receiving a query for specified text in one or more XML documents;
wherein said one or more XML documents comprise a plurality of nodes;
in response to receiving the query:
determining that the one or more XML documents are stored in a table comprising a plurality of rows, each row of said plurality of rows corresponding to a node of said plurality of nodes;
wherein each row of said plurality of rows includes:
an order key that indicates a hierarchical position of the node within the one or more XML documents, said order key being stored in a first column of said table; and
an indication of a name of the node, said indication stored in a second column of said table;
wherein the table comprises at least a first row for a first node and a second row for a second node, wherein the first node has a first node text value but does not have any descendant nodes, and wherein the second node has a second node text value and has one or more descendant nodes;
wherein the first row for the first node comprises the first node text value;
wherein the second row for the second node comprises a null node text value;
the table further comprising a third row comprising the second node text value; and
searching the node text values stored in the rows of the table for the specified text to determine at least one of a particular order key or a particular name of a particular node that contains the specified text;
wherein the method is performed by one or more computing devices.

19. The volatile or non-volatile computer-readable storage medium of claim 18, wherein execution of the one or more sequences of instruction by the one or more processors further causes determining whether a first part of the specified text exists in a first adjacent node of two or more adjacent nodes, and whether a second part of the specified text exists in a second adjacent node of two or more adjacent nodes.

20. The volatile or non-volatile computer-readable storage medium of claim 18, wherein execution of the one or more sequences of instruction by the one or more processors further causes rewriting the query to search for one or more order keys or node names.

* * * * *

UNITED STATES PATENT AND TRADEMARK OFFICE
CERTIFICATE OF CORRECTION

| | | |
|---|---|---|
| PATENT NO. | : 8,126,932 B2 | Page 1 of 1 |
| APPLICATION NO. | : 12/346393 | |
| DATED | : February 28, 2012 | |
| INVENTOR(S) | : Baby et al. | |

It is certified that error appears in the above-identified patent and that said Letters Patent is hereby corrected as shown below:

In column 6, line 24, delete "OderKey" and insert -- OrderKey --, therefor.

In column 17, line 58, in Claim 6, delete "whether at" and insert -- whether the at --, therefor.

Signed and Sealed this
Twenty-ninth Day of May, 2012

David J. Kappos
*Director of the United States Patent and Trademark Office*